United States Patent [19]

Kinnersley et al.

[11] Patent Number: 4,976,767
[45] Date of Patent: Dec. 11, 1990

[54] PLANT FOOD AND METHOD FOR ITS USE

[75] Inventors: Alan M. Kinnersley, Bedford Park; Wayne E. Henderson, Lisle, both of Ill.

[73] Assignee: CPC International Inc., Englewood Cliffs, N.J.

[21] Appl. No.: 823,857

[22] Filed: Jan. 29, 1986

[51] Int. Cl.⁵ .............................................. C05F 5/00
[52] U.S. Cl. ........................................ 71/26; 71/23; 71/25
[58] Field of Search ............................... 71/26, 23, 25

[56] References Cited

U.S. PATENT DOCUMENTS 2,901,864  9/1959  Hiler ................................ 71/26 X
4,510,130  4/1985  Platt et al. ............................ 514/2
4,551,164  11/1985  Tenzer .................................. 71/6

OTHER PUBLICATIONS

Watson, et al., "Improved Turf from Corn Gluten and Corn Hulls", *The Golf Course Reporter*, June, 1958.

*Primary Examiner*—Ferris H. Lander
*Attorney, Agent, or Firm*—Rockey and Rifkin

[57] ABSTRACT

A plant food with superior growth promoting properties that comprises a mixture of steepwater and other sources of nitrogen, phosphorus, and potassium. The optimum proportion of steepwater and other materials in the plant food is determined by analysis of growth response using the technique of response surface methodology.

12 Claims, 1 Drawing Sheet

ZUCCHINI SEEDLINGS GROWN WITH PLANT FOOD

ZUCCHINI SEEDLINGS GROWN WITH PLANT FOOD
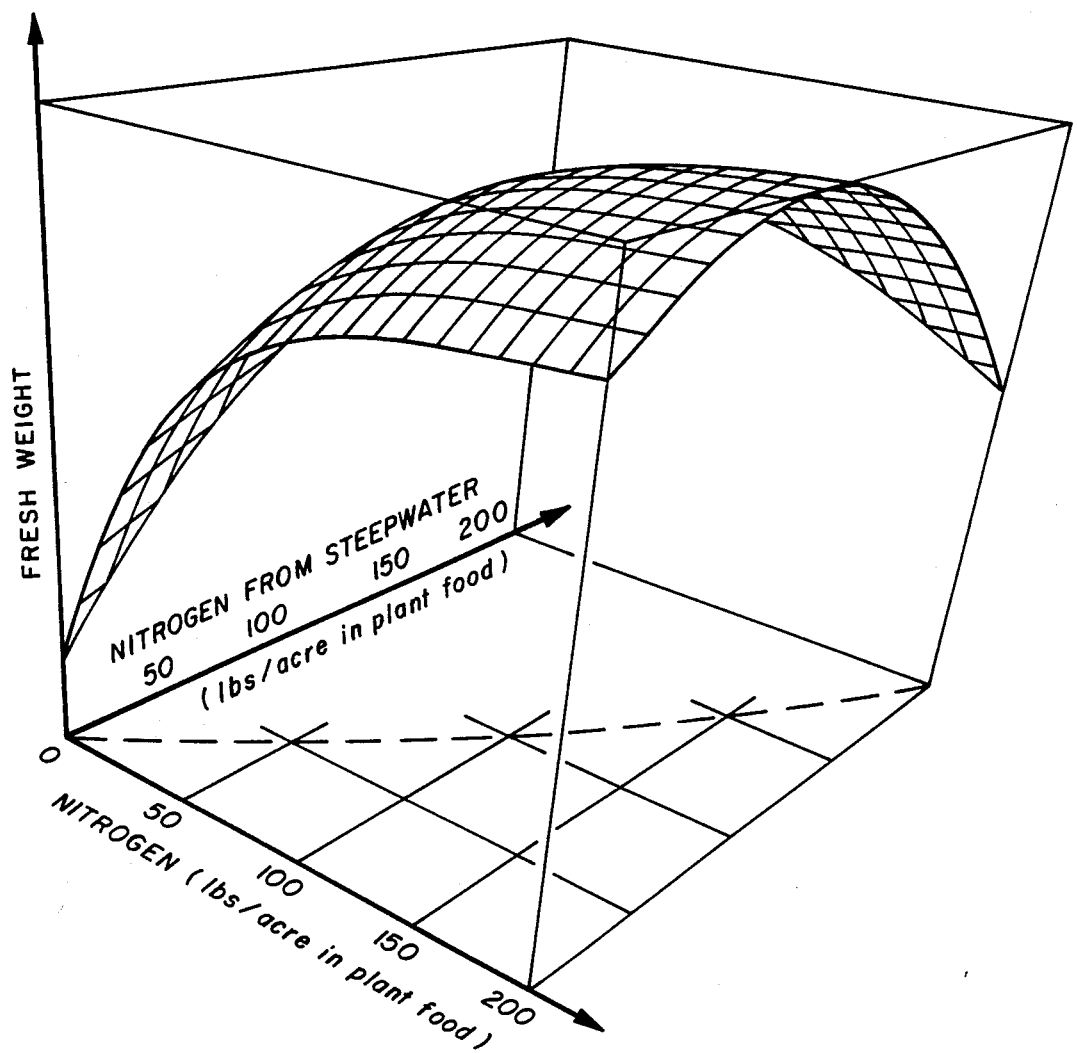

PLANT FOOD AND METHOD FOR ITS USE

FIELD OF THE INVENTION

The present invention relates to an improved plant food which comprises a mixture that includes the components of the steepwater derived from the wet milling of grain.

BACKGROUND OF THE INVENTION

In manufacturing starch by the wet-milling process, the grain is first soaked in warm water to soften the kernels. Soluble substances, such as sugars, proteins, and minerals, leach out of the kernel. This solution is drawn off the grain and part of the water is evaporated. The resulting concentrated solution is known as steepwater. If the evaporation is carried to completion, the residual solid material is known as steepwater solids.

Steepwater is generally added to fibrous milling residues to prepare animal feeds. Some steepwater is also sold as a fermentation nutrient. An early attempt to use steepwater as a lawn fertilizer did not give promising results. Although the grass started to grow more quickly after steepwater application, growth was not sustained, and the grass was easily injured if too much steepwater was applied.

It has now been discovered that when steepwater or steepwater solids are mixed with major plant nutrients (sources of nitrogen, phosphorus, and potassium) in proper proportions, an excellent plant food results. Such a product is more effective in increasing the growth of plants than either fertilizer containing the same amount of major plant nutrients or steepwater alone.

When ratios of nitrogen, phosphorus, and potassium are given herein, they refer to the conventional fertilizer ratios in which the nitrogen is given as "weight % N", phosphorus is given as "weight % $P_2O_5$", and potassium is given as "weight % $K_2O$".

SUMMARY OF THE INVENTION

In accordance with the present invention, there is provided an improved plant food for promoting the growth of a plant which comprises a mixture of steepwater and sufficient additional sources of nitrogen, phosphorus, and potassium, to give a plant food with a nitrogen:phosphorus:potassium ratio suitable for the growth of said plant wherein the amount of steepwater in the mixture is such that at least about 5% of the nitrogen in the mixture comes from the steepwater.

Also provided, in accordance with this invention, is a method for promoting the growth of plants which comprises supplying to the plant an effective amount of a plant food comprising a mixture of steepwater and sufficient additional sources of nitrogen, phosphorus, and potassium, to give a plant food with a nitrogen:phosphorus:potassium ratio suitable for the growth of said plant wherein the amount of steepwater in the mixture is such that at least about 5% of the nitrogen in the mixture comes from the steepwater.

Further provided, in accordance with this invention, is a method for determining the amount of steepwater to be incorporated in a plant food for a particular plant species. This method comprises:

growing plants of the desired species;

feeding the plants with a plant food containing various levels of steepwater and additional sources of nitrogen, phosphorus, and potassium;

measuring the increase in plant growth at a given time;

determining the relationship between increase in plant growth and amount of nitrogen in the plant food coming from the steepwater;

determining the amount of nitrogen coming from the steepwater which gives the desired increase in plant growth; and calculating the amount of additional sources of nitrogen, phosphorus, and potassium to be mixed with the steepwater to give the plant food for the particular plant species.

DETAILED DESCRIPTION OF THE INVENTION

The corn wet-milling process is well known and has been extensively described in the literature. See, for example, the chapter entitled "Starch", by R. L. Whistler and J. R. Daniel, beginning on page 492 of Volume 21 of *Kirk-Othmer: Encyclopedia of Chemical Technology*, Third Edition, John Wiley and Sons, Inc., New York (1983). Other grains, such as wheat and sorghum, may also be subjected to the wet-milling process.

When corn is subjected to the wet-milling process, the grain is first soaked in warm water which usually contains a small amount of sulfur dioxide. When wheat is subjected to the wet-milling process, sulfur dioxide is not ordinarily added to the water, since it destroys the vitality of wheat gluten. After the grain is removed, the residual aqueous solution containing various substances which have leached out of the grain is often referred to as steepwater. As used herein, the term "steepwater" will also be used to include this solution which has been concentrated by evaporation and to the steepwater solids which remain when evaporation is carried out to completion.

In the practice of this invention, the steepwater is mixed with compounds containing nitrogen, phosphorus, and potassium. The compounds containing these elements can be any that have the elements in forms which are metabolizable by plants. For example, the nitrogen can be present as ammonium salts, nitrate salts, or organic compounds containing nitrogen, such as urea. The phosphorus can be in the form of salts, such as phosphate salts, or in naturally-occurring products, such as bone meal. The potassium compounds normally employed are the salts of this element.

The most desirable proportions of steepwater and other sources of major plant nutrients in the plant food of this invention will vary somewhat with the particular plant species fertilized. We have discovered that the optimum composition of plant food for a given species can be determined by the following method. Groups of plants of the species are grown under similar conditions. Each group of plants is fed with a different level of plant food containing a different amount of steepwater. At a given time, the plants are then harvested and weighed. A sufficient number of plant groups are grown to determine the constants: a, b, c, d, f, and g in the following equation:

$$\ln z = a + b(1 - e^{-cx}) + dy + fy^2 + gxy$$

where ln = logarithm to the base e z = plant weight per unit area of field
x = nitrogen in plant food (weight per unit area of field)
y = nitrogen from steepwater in plant food (weight per unit area of field)
e = the base of the system of natural logarithms The results of such an experiment can be analyzed by the technique of response surface methodology. (Box, G. E. P., Hunter, W. G., and Hunter, J. S., *Statistics for Experimenters*, pp. 510–539, J. Wiley and Sons, New York, N.Y., 1978.) This method permits determination of the combination of steepwater and other nutrients which gives the optimum or most economical growth promoting combination of ingredients in the plant food. A three-dimensional plot resulting from such an analysis is given in FIG. 1.

The plant food of this invention can be either a solid or a liquid. If it is employed as a liquid, it is commonly prepared by adding various water-soluble sources of nitrogen, phosphorus, and potassium to the steepwater solution. It is often convenient for ease of handling and measurement to dissolve these materials in water before they are added to the steepwater.

When it is desired to use the plant food of this invention in a solid form, the product can be prepared as a physical mixture of steepwater solids and other solid ingredients. Alternatively, concentrated aqueous solutions of the ingredients can be mixed with a solid adsorbent. Any solid adsorbents known to be suitable as a fertilizer base or as a soil conditioner can be employed. One adsorbent which is particularly suitable for this purpose is spent corn germ available as a by-product of the corn wet-milling process.

For many plants, the plant food is advantageously applied to the soil as a solid or in solution used for watering the plants. If the plants are grown hydroponically, the plant food is incorporated in the nutrient solution in which the plant is grown.

Plants which can be treated in accordance with the invention include house plants, decorative and ornamental shrubs and trees, and agricultural crops and trees including, but not limited to: petunias, impatiens, chrysanthemums, geraniums, poinsettias; spinach, mushrooms, carrots, radishes, beans, wheat, corn, tomatoes, other vegetables; cotton, rice, barley, and the like; apple, pear, citrus and other fruit trees, and the like.

The plant food can be mixed with other agricultural chemicals, such as antibacterials, insecticides, ascaricides, nematocides, fungicides, selective herbicides, and the like.

The following examples illustrate certain embodiments of the present invention. Unless otherwise stated, all proportions and percentages are provided on the basis of weight.

EXAMPLE 1

Twelve radish seedlings were grown in a greenhouse in 19-cm diameter pots, four to a pot. The seedlings were grown from Scarlet Globe radish seeds, Yopp Seed Company, Carbondale, Ill. The plants were watered as needed and 100 ml of a nutrient solution was added to each pot once a week. The nutrient solution was prepared by diluting 4 ml of Hyponex 5:10:5 commercial fertilizer with 1 liter of water. Hyponex is a liquid fertilizer available from the Hyponex Corporation, Fort Wayne, Ind. This dilution gives a nitrogen concentration of 200 parts per million (ppm). A total of 400 ml of solution was applied to each pot during the 30-day growing period.

A second group of 12 radish plants was grown in a similar fashion except in this case the nutrient solution was prepared by diluting 4 ml of steepwater containing a nitrogen:phosphorus:potassium ratio of 4:3:3 with a liter of water.

A third group of 12 radish plants was grown under similar conditions except that the nutrient solution added to the plants was prepared by diluting 4 ml of a solution containing steepwater and sufficient additional sources of nitrogen, phosphorus, and potassium to give a product containing these nutrients in a 5:10:5 ratio. Again, a total of 400 ml of the solution was added to each pot during the growing period.

Steepwater is available from CPC International Inc., Englewood Cliffs, N.J., as E801 ARGO ® Steepwater. The sample used had a pH of 4.4 and contained 48.3% dry solids. Analysis showed that on a dry solids basis it contained: total nitrogen, 8.0%; amino acids, 19.1%; total potassium, 4.6%; lactic acid, 27.4%; total phosphate, 8.2%; phytic acid, 8.6%; ash, 17.3%; reducing sugars, 1.9%; and less than 10 parts per million (ppm) of heavy metals.

The mixture of steepwater and other nutrients having a 5:10:5 composition was prepared as follows. An acidic solution with a nitrogen:phosphorus:potassium ratio of 3:6:3 was prepared by mixing 129.4 g of steepwater with 4 ml of 4.0M potassium dihydrogen phosphate, 8.1 g of 85% phosphoric acid, and sufficient water to give a total weight of 166.6 g. An alkaline solution with a nitrogen:phosphorus:potassium ratio of 7:14:7 was prepared by mixing 17.7 g of diammonium hydrogen phosphate, 9.1 g of potassium nitrate, 1.9 ml of 4.0M potassium dihydrogen phosphate, and sufficient water to give a final weight of 71.4 g. Equal weights of this 7:14:7 solution and the 3:6:3 steepwater-containing solution were mixed and the pH of the resulting 510:5 solution was adjusted to pH 5.5, the same pH as the Hyponex solution.

After 30 days, the plants were harvested and the average dry weights of the plants and of the roots for each group of 12 plants were determined. The results given in Table I clearly show the advantage of combining steepwater with other nutrients. This combination, the plant food of this invention, is superior to the commercial fertilizer at the same level of nitrogen, phosphorus, and potassium. It is also a superior plant food to steepwater alone.

TABLE I

| RADISHES GROWN WITH VARIOUS PLANT FOODS | | |
|---|---|---|
| Plant Food | Total Plant Average Dry Weight (grams) | Radish Average Dry Weight (grams) |
| Fertilizer[a] (5:10:5) | 4.13 | 1.82 |
| Steepwater[b] (4:3:3) | 3.78 | 1.74 |
| Steepwater Plus Nutrients (5:10:5) | 5.12 | 2.18 |

[a] A comparative test, commercial fertilizer Hyponex - not an example of this invention.
[b] A comparative test, commercial steepwater - not an example of this invention.

EXAMPLE 2

In this experiment, radishes were grown in field plots, 20 square feet (1.86 m²) in size. Black top soil was tilled to a depth of 30 cm and plant food containing equal percentages of nitrogen, phosphorus, and potassium was spread evenly over each plot which was then seeded with Scarlet Globe radish seeds, available from the Yopp Seed Company of Carbondale, Ill. Plant food containing steepwater was added to one plot at the level of 30 lbs nitrogen per acre and to a second plot at the rate of 60 lbs nitrogen per acre. The steepwater containing plant food had a nitrogen:phosphorus:potassium ratio of 4:4:4. It was prepared by mixing 2 kg of a sample of steepwater which contained by fertilizer analysis 4.8% nitrogen, 4.1% phosphorus, and 3.1% potassium with 405 g of a salt solution. The salt solution had been prepared by mixing 97.5 g of dipotassium hydrogen phosphate and 64.3 g of potassium hydroxide in 1 liter of water.

For comparative purposes, radishes were grown on test plots containing fertilizer at the rate of 30, 60, and 120 lbs nitrogen per acre. The fertilizer was Peter's 20:20:20 fertilizer, available from W. R. Grace and Company, Fogelsville, Pa. Radish plants were harvested after 30 days, and the weights of the total plant and the roots were determined. The values given in Table II are the average weights for 50 radish plants from each plot. These results clearly show the superior growth promoting ability of the plant food containing steepwater over that of the comparative plant food without steepwater. This is true even when much larger amounts of the comparative plant food are used.

TABLE II
FIELD-GROWN RADISHES WITH VARIOUS LEVELS OF PLANT FOOD

| Plant Food | Total Plant Average Dry Weight (grams) | Radish Average Dry Weight (grams) |
|---|---|---|
| Steepwater Plus Nutrients | | |
| 30 lbs N/acre | 8.37 | 4.18 |
| 60 lbs N/acre | 8.42 | 4.32 |
| Comparative Test Fertilizer | | |
| 30 lbs N/acre | 5.05 | 2.05 |
| 60 lbs N/acre | 7.35 | 3.23 |
| 120 lbs N/acre | 9.51 | 4.72 |

EXAMPLE 3

The procedure of Example 2 was followed except that the plots were planted with Danvers half-long carrot seeds, available from the Vaughan Mandeville Seed Company, Downers Grove, Ill. In this experiment, all of the carrots were harvested and weighed. The results given in Table III show the greatly increased yield of carrots obtained with comparatively low levels of nutrient from the plant food of this invention.

TABLE III
FIELD-GROWN CARROTS WITH VARIOUS LEVELS OF PLANT FOOD

| Plant Food | Average Dry Weight Per Carrot (grams) | Number of Carrots | Total Weight of Carrots (grams) |
|---|---|---|---|
| Steepwater Plus Nutrients | | | |
| 30 lbs N/acre | 11.81 | 280 | 3306 |
| 60 lbs N/acre | 15.12 | 139 | 2101 |
| Comparative Test Fertilizer | | | |
| 30 lbs N/acre | 3.62 | 119 | 431 |
| 60 lbs N/acre | 10.25 | 102 | 1045 |
| 120 lbs N/acre | 16.10 | 133 | 2129 |

EXAMPLE 4

Radishes were grown in a greenhouse with one plant per 5-cm×5-cm square plastic container using a commercial soil-less mix to which was added plant food in one application. The plants were watered as needed and harvested 35 days after planting. At the end of the growth period, plants were cut off at the ground and the tops were weighed. In each case, the plant food added contained equal percentages of nitrogen, phosphorus, and potassium. The results of 10 statistically designed experiments are given in Table IV. These clearly show that a proper combination of steepwater and other nutrients causes more rapid growth in the radishes than does either commercial fertilizer or steepwater at the same level of nutrients.

TABLE IV
GREENHOUSE RADISHES

| Experiment No. | lbs N/acre From Commercial Fertilizer[a] | lbs N/acre From Steepwater Mix[b] | Top Weight[c] (grams) |
|---|---|---|---|
| 1 | 200 | 0 | 4.35 |
| 2 | 100 | 0 | 5.90 |
| 3 | 0 | 0 | 2.08 |
| 4 | 133 | 33 | 7.78 |
| 5 | 100 | 100 | 7.10 |
| 6 | 67 | 67 | 7.15 |
| 7 | 33 | 133 | 7.48 |
| 8 | 33 | 33 | 4.62 |
| 9 | 0 | 200 | 5.88 |
| 10 | 0 | 100 | 4.44 |

[a]The commercial fertilizer was the 20:20:20 Peter's fertilizer used in Example 2. Experiments 1, 2, 3, 9, and 10 are comparative tests, not examples of this invention.
[b]The steepwater mixture was a 4:4:4 mixture similar to that prepared in Example 2.
[c]Each weight is the average weight of at least 20 plants.

EXAMPLE 5

The procedure of Example 4 was followed except that zucchini squash seeds were substituted for the radish seeds. In this case, the plants were harvested 18 days after these seeds were sown. The results of these experiments are given in Table V. They again show the superiority of a properly selected combination of steepwater with other sources of nitrogen as a growth promoter and the method which can be used to determine the most desirable combination of steepwater with the other nutrients. The results of these experiments are presented graphically in the figure.

TABLE V

GREENHOUSE ZUCCHINI

| Experiment No. | lbs N/acre | | Top Weight[c] (grams) |
|---|---|---|---|
| | From Commercial Fertilizer[a] | From Steepwater Mix[b] | |
| 1 | 200 | 0 | 4.50 |
| 2 | 100 | 0 | 4.34 |
| 3 | 0 | 0 | 2.18 |
| 4 | 133 | 33 | 4.87 |
| 5 | 100 | 100 | 5.37 |
| 6 | 67 | 67 | 4.56 |
| 7 | 33 | 133 | 4.50 |
| 8 | 33 | 33 | 4.57 |
| 9 | 0 | 200 | 3.71 |
| 10 | 0 | 100 | 4.20 |

[a] The commercial fertilizer was the 20:20:20 Peter's fertilizer used in Example 2. Experiments 1, 2, 3, 9, and 10 are comparative tests, not examples of this invention.
[b] The steepwater mixture was a 4:4:4 mixture similar to that prepared in Example 2.
[c] Each weight is the average weight of at least 20 plants.

Thus, it is apparent that there has been provided, in accordance with the invention, a plant food and a method for its preparation and use that fully satisfy the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications, and variations as set forth within the spirit and scope of the appended claims.

What is claimed is:

1. An improved plant food for promoting the growth of a plant which comprises a mixture of steepwater and sufficient additional sources of nitrogen, phosphorus, and potassium to give a plant food with a nitrogen:phosphorus:potassium ratio suitable for the growth of said plant, wherein the amount of steepwater present in the mixture is such that at least about 5% of the nitrogen in the mixture comes from the steepwater.

2. The plant food of claim 1 wherein the steepwater is derived from the wet-milling of corn.

3. The plant food of claim 1 wherein the components are present in an aqueous solution.

4. The plant food of claim 1 wherein the components are present as a free-flowing solid.

5. The plant food of claim 4 wherein the free-flowing solid comprises a mixture of concentrated aqueous solution of the ingredients with a solid adsorbent.

6. The plant food of claim 5 wherein the solid adsorbent is spent corn germ.

7. A method for promoting the growth of plants which comprises supplying to the plant an effective amount of a plant food comprising a mixture of steepwater and sufficient additional sources of nitrogen, phosphorus, and potassium to give a plant food with a nitrogen:phosphorus:potassium ratio suitable for the growth of said plant wherein the amount of steepwater in the mixture is such that at least about 5% of the nitrogen in the mixture comes from the steepwater.

8. The method of claim 7 wherein the steepwater is derived from the wet milling of corn.

9. The method of claim 7 wherein the components of the plant food are present in an aqueous solution.

10. The method of claim 7 wherein the components of the plant food are present as a free-flowing solid.

11. The method of claim 10 wherein the free-flowing solid comprises a mixture of concentrated aqueous solutions of the ingredients with a solid adsorbent.

12. The method of claim 11 wherein the solid adsorbent is spent corn germ.

* * * * *